(12) United States Patent
Nesbitt

(10) Patent No.: US 6,347,747 B1
(45) Date of Patent: Feb. 19, 2002

(54) STAND-ALONE THERMOSTAT

(75) Inventor: Bryce Nesbitt, Berkley, CA (US)

(73) Assignee: Intellinet, Inc., Naples, FL (US)

( * ) Notice: Subject to any disclaimer, the term of this patent is extended or adjusted under 35 U.S.C. 154(b) by 0 days.

(21) Appl. No.: 09/492,952

(22) Filed: Jan. 27, 2000

Related U.S. Application Data

(63) Continuation-in-part of application No. 09/302,844, filed on Apr. 30, 1999, now abandoned.
(60) Provisional application No. 60/083,766, filed on May 1, 1998.

(51) Int. Cl.$^7$ ............................ G01K 1/00; G05D 15/00
(52) U.S. Cl. ............................ 236/78 D; 236/DIG. 19; 307/208; 337/380; 374/208
(58) Field of Search .................. 236/78 R, DIG. 19, 236/46 R; 307/208; 337/380; 361/694; 374/208

(56) References Cited

U.S. PATENT DOCUMENTS

| 4,347,443 A | * | 8/1982 | Whitney ...................... 307/117 |
| 4,659,236 A | * | 4/1987 | Hobbs ......................... 374/208 |
| 5,008,775 A | * | 4/1991 | Schindler et al. ..... 236/DIG. 19 |
| 5,381,950 A | * | 1/1995 | Aldridge ................. 337/380 X |
| 5,485,954 A | * | 1/1996 | Guy et al. ................. 236/78 R |

* cited by examiner

Primary Examiner—William Wayner
(74) Attorney, Agent, or Firm—George T. Marcou; Kilpatrick Stockton LLP

(57) ABSTRACT

A stand-alone thermostat that mounts flush to a wall and obtains improved accuracy in ambient temperature measurement by actively intaking air from the room interior. An internal temperature measurement chamber communicates between air inlet and outlet. A heat generator located within the temperature measurement chamber causes thermal convection, the convection generating an air flow thus drawing ambient room air into the measurement chamber, across a temperature sensor, and out the outlet air opening. This feature assures that the temperature of room interior air is accurately measured.

24 Claims, 1 Drawing Sheet

STAND-ALONE THERMOSTAT

CONTINUATION-IN-PART

This application is a continuation-in-part of Applicant's U.S. patent application Ser. No. 09/302,844 titled "STAND-ALONE THERMOSTAT" filed Apr. 30, 1999, now abandoned, which claims benefit of Prov. No. 60/083,766 filed May. 1, 1998.

FIELD OF THE INVENTION

This invention relates to a system and method for a stand-alone thermostat. In particular, the invention relates to a thermostat that mounts flush to a wall surface and takes in ambient air from the interior of a room. The ambient air is passed by thermal convection across a temperature sensor, thus allowing an accurate measurement of the ambient room temperature.

BACKGROUND OF THE INVENTION

In office buildings and other occupied spaces which are serviced by heating, ventilating, and air conditioning systems (HVAC), the HVAC equipment is normally controlled by a temperature sensor or thermostat in order to maintain the temperature in the occupied space at a desired level. Typically, the temperature sensor is contained in an enclosure that protrudes into the room from one of its walls. Even though thermostat units that protrude into the room are recognized as architecturally and aesthetically undesirable, such devices have been considered a necessary evil that must be tolerated in order to achieve both good thermal contact with ambient room air and minimal contact with the wall. In the case of wall mounted thermostats, the active temperature sensing element is normally hidden behind a cosmetic cover, which is provided with openings so that room air can migrate behind the cover and come into contact with the temperature sensing element. Measurement accuracy requires that the temperature sensing element have a maximum thermal contact with the air in the conditioned space and minimal thermal contact with the wall and wall space air, which may have a temperature considerably different from that of the ambient room air and thereby introduce significant temperature measurement error.

Several existing art thermostats attempt to address some of the problems of the conventional approach. The thermostat that is subject of U.S. Pat. No. 4,659,236 to Hobbs discloses a flush mounted thermostat. The thermostat of Hobbs includes a cavity with a sensor plate and an insulating block to thermally insulate the sensor plate from the mounting block plate, and integrated circuitry mounted such that heat generated from the circuitry does not interfere with temperature sensing. Hobbs does not include any air circulation system to induce air flows from the room interior across the temperature sensor.

The device of U.S. Pat. No. 5,485,954 to Guy et al. discloses a reduced profile thermostat. The thermostat of Guy et al. includes a cover with a grill opening for free passage of room temperature air into the interior space of the thermostat. It does not include a device for circulating air, such as a heat source, nor does it utilize two sets of openings to facilitate ambient air flow from the room interior across the temperature sensing element.

U.S. Pat. No. 4,347,443 to Whitney discloses a thermostat that uses convective air flow to remove heat generated by electrical components of the thermostat. The device of Whitney includes a circuit board with heat generating electrical components and temperature sensing element mounted toward the front side of the circuit board. The temperature sensing element is thermally shielded from the heat generating electrical components. A passage is provided for convective air flow ("air wash") across the back side of the thermostat circuit board to provide cooling of the heat generating electrical components. Temperature differences between room and wall produces an air wash that also traverses a passage containing the temperature sensor.

The thermostat of Whitney does not describe a flush mounted thermostat. Further, Whitney does not rely upon a heat source specifically placed to induce convective air flow across a temperature sensing element, but rather relies on the temperature difference between wall and room to create convection for purposes of air wash across the sensing element.

U.S. Pat. No, 5,381,950 of Aldridge discloses a flush mounted thermostat having a thermostat cover that includes intake louvers that allow ambient air to be drawn across the sensor from the room. The thermostat of Aldridge is either wall mounted or flush mounted and includes two sets of louvers for creating air flow over a temperature sensor, air flow is induced across the temperature sensing element by a fan, and preferably a piezoelectric fan. Aldridge does not include an embodiment directed to convective air flow across the temperature sensing element.

SUMMARY OF THE INVENTION

It is an advantage of the present invention to provide a stand-alone thermostat that flush mounts to a wall and includes a sensor exposed to circulating air.

It is a further advantage of the present invention to provide a device for circulating air.

It is further advantage of the present invention to provide a heat source to induce convective air flow across a temperature sensor.

It is a further advantage of the present invention to provide at least two interconnected internal chambers enclosing heat source and temperature sensor elements.

It is a further advantage of the present invention to provide at least one opening for creating air flow over a temperature sensor.

It is a further advantage of the present invention to provide an embodiment including a circuit board containing heat generating and temperature sensing elements, a surface of the circuit board also forming a surface of the internal chambers.

It is a further advantage of the present invention to provide an embodiment having an elastomeric key surface, a back surface of the elastomeric key surface also forming a surface of the internal chambers.

The present invention comprises a stand-alone thermostat that mounts flush to a wall and intakes ambient air from the room interior. A heat generator located near the top of the device causes thermal convection, thus drawing ambient room air across a temperature sensing element. This feature assures that the temperature of room interior air is accurately measured.

To achieve the stated and other advantages of the present invention, as embodied and described below, the invention includes a low-profile thermostat housing, the thermostat housing comprising: at least a first opening enabling ambient air to enter the housing, at least a second opening enabling air to exit the housing; an internal circuit board; an elastomeric key pad comprising a front key surface and a back gasket surface, at least an upper temperature measurement chamber and at least a lower temperature measurement chamber, the temperature measurement chambers defined by the circuit board front surface and the elastomeric key pad back gasket surface, the temperature measurement chambers communicating with the first and second thermostat housing openings by at least two openings that align with the first and second thermostat housing openings, the temperature measurement chambers further communicating with each other via a connecting air passage, and further comprising: a temperature sensing element and a heat generating element, the heat generating element positioned within the upper temperature measurement chamber such that convective air flow is created, the air flow causing ambient air to enter the lower temperature measurement chamber via the first thermostat housing opening, pass over the temperature sensing element, proceed to the upper temperature measurement chamber via an interconnecting air passage, receive heat from the heat generating element, and exit the upper temperature measurement chamber via the second thermostat housing opening.

Additional objects, advantages and novel features of the invention will be set forth in part in the description that follows, and in part will become more apparent to those skilled in the art upon examination of the following detailed description of the invention.

DETAILED DESCRIPTION OF THE PREFERRED EMBODIMENTS

Figure 1:
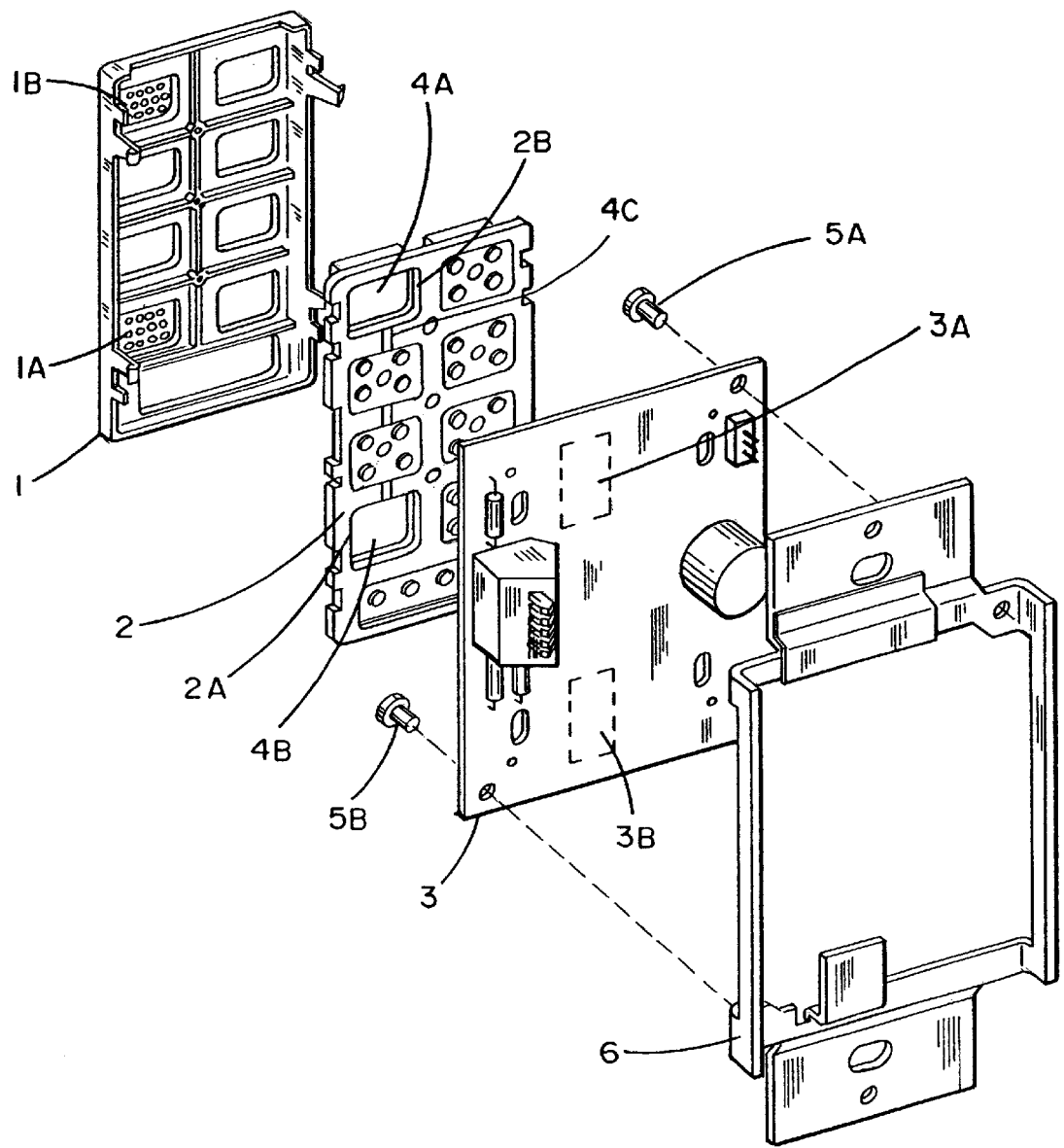
FIG. 1 represents a device in accordance with an embodiment of the present invention.

An embodiment of the present invention comprises a stand-alone thermostat that mounts flush to a wall and takes in ambient air from the interior of the room. An internally mounted heat generator located near the top of the thermostat enclosure induces convective air flow, under which influence ambient room air is drawn into a temperature measurement chamber internal to the thermostat enclosure and across a temperature sensing element. This feature assures that the temperature of ambient room air is accurately measured, rather than wall space air.

In an embodiment of the present invention, the temperature measuring chamber is further divided into an upper temperature measuring chamber and a lower temperature measuring chamber, the upper and lower temperature measuring chambers connected by, for example, a connecting air chamber, which allows passage of air between the upper and lower temperature measuring chambers. The heat generating element is contained in the upper chamber and the temperature sensing element is contained in the lower chamber. This feature reduces temperature measurement errors caused by convective heat transfer between the temperature generating element and the temperature measuring element.

In particular, the invention includes holes in the cover of the flush mounted thermostat to allow ingress and egress of ambient room air. A printed circuit board within the thermostat enclosure serves a second purpose as a thermal insulator, which, together with a surface contour in the elastomeric key material, such as a ring, serves an additional purpose of creating a gasket that seals the periphery of the temperature measurement chamber. In addition, thermal insulating properties of the elastomeric key material further reduce temperature measurement error due to conductive heat transfer from the heat generating element to the temperature sensing element.

Using two sets of holes, one at the top and one at the bottom of the thermostat enclosure, ambient room air is circulated within the thermostat across the temperature sensing element contained in the lower temperature measuring chamber. The holes at top and bottom are connected, by for example, a connecting air chamber, and a heat generator is mounted near the top holes so that thermal convection resulting from the heat generator draws ambient room air from the bottom holes to the top holes across the temperature sensing element.

FIG. 1 shows an exploded view of a thermostat of an embodiment of the present invention. In FIG. 1, a plastic cover 1 contains holes 1A and 1B for air flow. An elastomer 2, fitting into the plastic cover 1, also contains holes 2A and 2B for air flow and further forms a front surface of a temperature measurement air chamber. A back surface of the temperature measurement air chamber is formed by a printed circuit board 3.

In an embodiment of the present invention shown in FIG. 1, an upper temperature measurement chamber 4A and lower temperature measuring chamber 4B are created by surface contours of the elastomer 2, which serves an additional purpose of forming a gasket seal of the temperature measurement chambers 4A, 4B where elastomer 2 makes contact with the front surface of printed circuit board 3. A continuous passage for the movement of air between the lower temperature measurement chamber 4B and the upper temperature measurement chamber 4A is provided by the connecting air chamber 4C, which is also provided by a contour in the surface of elastomer 2. The front surface of circuit board 3 is provided with a heat generating element 3A and a temperature sensing element 3B, and each element 3A, 3B being positioned such that the temperature measuring element 3B is located within the lower temperature measurement chamber 4B and the heat generating element 3A is located within the upper temperature measurement chamber 4A. The printed circuit board 3 is connected to a back frame 6 by, for example, two screws 5A, 5B and the elastomer 2 and front cover 1 are assembled to the circuit board 3 such that upper and lower vents 1A, 1B in the front cover 1 align with holes 2A and 2B in the elastomer 2 to allow the passage of ambient room air through the thermostat.

While the above examples and descriptions have been provided for ease of understanding, they should not be construed to limit the invention as set forth in the appended claims. Obvious variations and modifications to one of ordinary skill in the art are within the scope of the present invention.

I claim:

1. A thermostat, comprising:
   a low-profile thermostat housing configured for flush mounting onto a wall surface;
   a front cover of the thermostat housing;
   at least a first opening in the front cover of the thermostat housing, the first opening enabling ambient air to enter the housing;
   at least a second opening in the front cover of the thermostat housing, the second opening enabling air to exit the housing;
   a first temperature measurement chamber extending from the first opening;
   a second temperature measurement chamber extending from the second opening;

a circuit board mounted in the thermostat housing;

an elastomeric pad comprising a front surface and a back surface mounted between the front cover and the circuit board, wherein the first temperature measurement chamber and the second temperature measurement chamber are defined at least in part by the elastomeric pad and a front surface of the circuit board;

a connecting air chamber within the thermostat housing, the connecting air chamber communicating with the first temperature measurement chamber and the second temperature measurement chamber;

a temperature sensing element in the first temperature measurement chamber and thermally insulated at least in part by the elastomeric pad; and a heat generating element in the second temperature measurement chamber to create convective air flow causing an air flow into the first opening, across the temperature sensing element, and out the second opening.

2. The thermostat of claim 1, wherein the elastomeric pad includes a front key surface.

3. The thermostat of claim 1, wherein the elastomeric pad includes a back gasket surface.

4. The thermostat of claim 1, wherein the thermostat housing includes a back frame.

5. The thermostat of claim 4, wherein the front cover and elastomeric pad are assembled to the circuit board.

6. The thermostat of claim 1, wherein the first opening is situated in a lower part of the front cover.

7. The thermostat of claim 1, wherein the second opening is situated in an upper part of the front cover.

8. The thermostat of claim 1, wherein the circuit board is affixed to the back frame.

9. The thermostat of claim 1, wherein the circuit board includes a thermally insulating material.

10. The thermostat of claim 4, wherein the back frame is designed for flush mounting on a wall.

11. The thermostat of claim 1, wherein the heat generating element is mounted on the circuit board.

12. The thermostat of claim 1, wherein the temperature sensing element is mounted on the circuit board.

13. A method for providing ambient temperature measurement using a flush mounted thermostat, the thermostat comprising: a housing, the housing having a front cover wherein the front cover has a first air opening and a second air opening; an elastomeric key pad comprising a first key surface and a second gasket surface, a first key pad air opening and a second key pad air opening; a circuit board comprised of insulating material; a back frame; a temperature sensing element; a heat generating element; a first temperature measurement chamber, a second temperature measurement chamber, comprising the steps of:

configuring the thermostat to have a low profile;

positioning the key pad between the front cover and the circuit board;

configuring the thermostat for flush mounting onto a wall surface;

defining the first and second temperature measurement chambers whereby the chambers are bounded at least in part by the circuit board and the key pad, the key pad thermally insulating at least in part the first and second temperature measurement chambers;

configuring the heat generating element within the thermostat to produce heat;

configuring the thermostat to impart movement to air within the thermostat as a result of the heat generated by the heat generating element;

providing a channel for the flow of ambient air into the thermostat via an air inlet opening as a result of the convective air movement within the thermostat;

providing a channel for the flow of ambient air across the temperature sensing element positioned within the thermostat;

providing an air exit opening to exhaust the ambient air; and configuring the temperature sensing element to measure the temperature of the ambient air.

14. The method according to claim 13, further comprising the step of:

positioning the circuit board between the key pad and the back frame.

15. The method according to claim 14, further comprising the step of:

fastening the circuit board to the back frame.

16. The method according to claim 13, further comprising the step of:

aligning the first key pad air opening with the first air opening of the front cover.

17. The method according to claim 16, further comprising the step of:

aligning the second key pad air opening with the second air opening of the front cover.

18. The method according to claim 13, further comprising the step of:

positioning the first air opening on the front cover below the second air opening on the front cover.

19. The method according to claim 13, further comprising the step of:

assembling the front cover, elastomeric key pad, circuit board, and back frame into a single unit.

20. The method according to claim 13, further comprising the step of:

mounting the back frame to the wall surface.

21. The method according to claim 13, further comprising the step of:

configuring the first temperature measurement chamber to include the temperature sensing unit.

22. The method according to claim 21, further comprising the step of:

aligning the first temperature measurement chamber with the first air opening on the front cover.

23. The method according to claim 13, further comprising the step of:

configuring the second temperature measurement chamber to include the heat generating unit.

24. The method according to claim 13, further comprising the step of:

positioning the heat generating unit above the temperature sensing unit.

* * * * *